C. & A. C. Wilhelm, 2 Sheets. Sheet 1.

Lamp Shade.

No. 1025. Reissued Aug. 14. 1860.

Witnesses.

J. Wm. Child

F. D. Baquet

Inventor.

Charles Wilhelm

Anna Catharine Wilhelm

C. & A. C. Wilhelm, 2 Sheets, Sheet 2.

Lamp Shade.

No. 1025. Reissued Aug. 14. 1860.

Witnesses.

J. Edwin Child

F. D. Baquet

Inventor.

Charles Wilhelm

Anna Catharine Wilhelm

UNITED STATES PATENT OFFICE.

CHARLES WILHELM AND ANNA C. WILHELM, OF PHILADELPHIA, PA.

IMPROVEMENT IN LAMP-SHADES.

Specification formingpart of Letters PatentNo. 23,875, dated May 3, 1859; Reissue No. 1,025, dated August 14, 1860.

*To all whom it may concern:*

Be it known that we, CHARLES WILHELM and ANNA C. WILHELM, of the city and county of Philadelphia, and State of Pennsylvania, have made a new and useful Improvement in Lamp-Shades; and I do hereby declare the following to be a full and exact description of the same, reference being had to the annexed drawings, making a part of this specification, in which—

Figure 1:
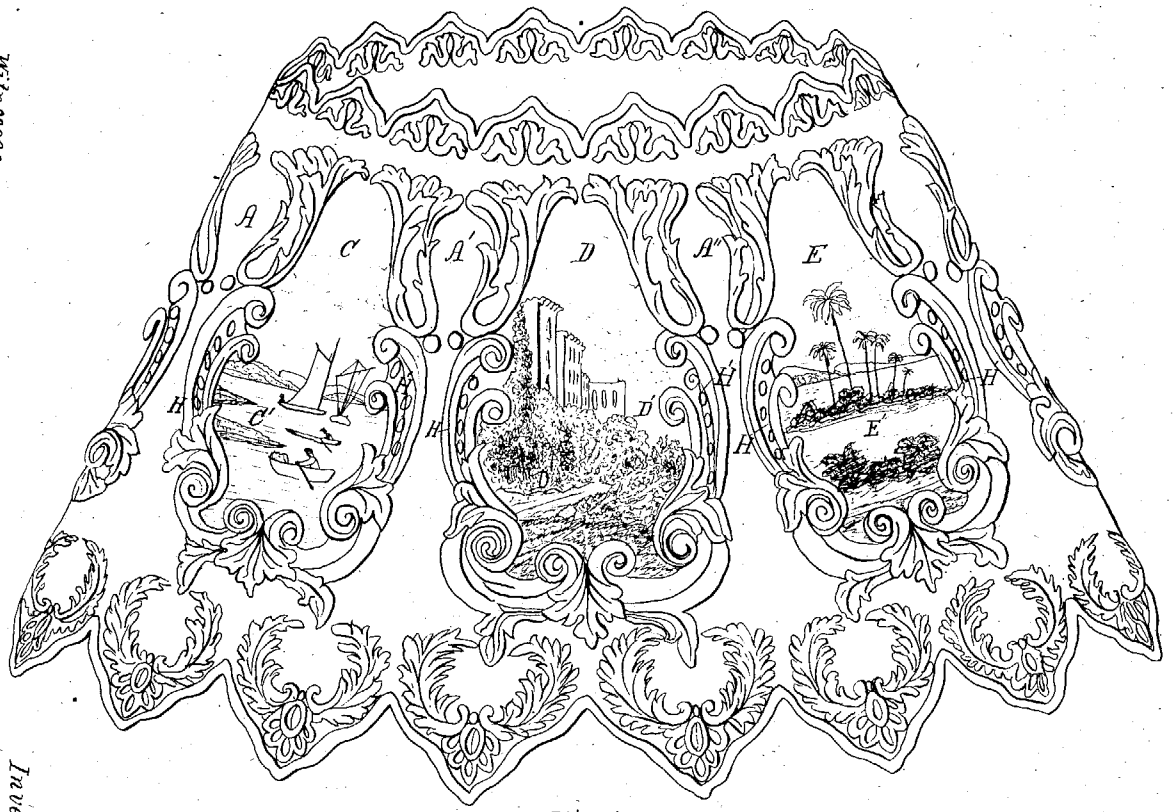
Figure 2:
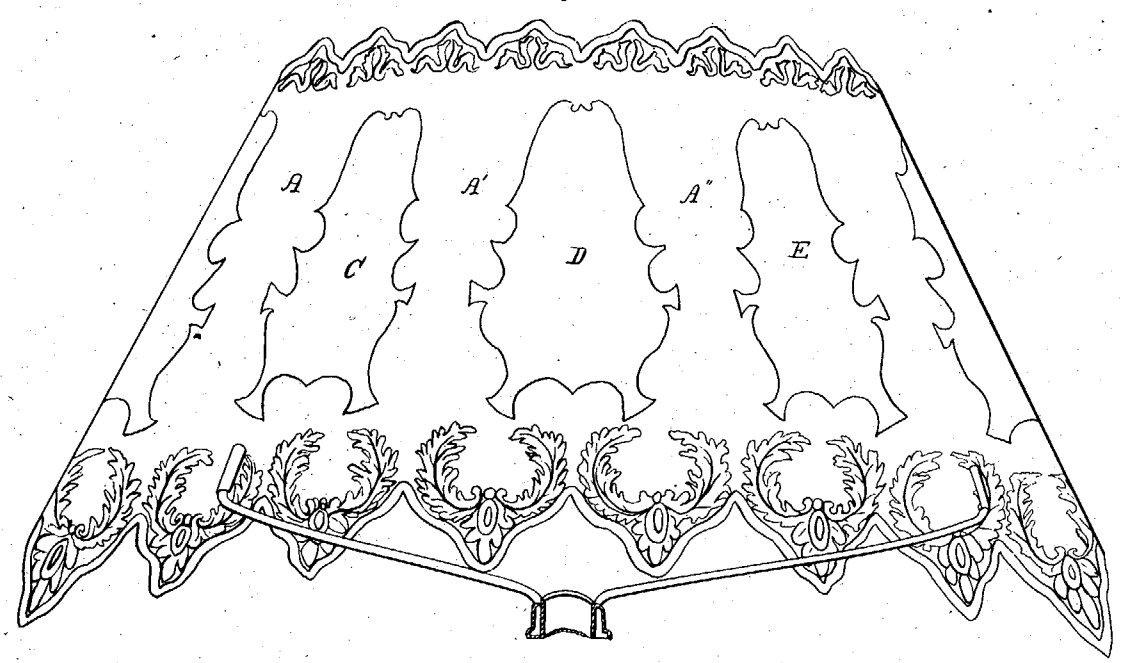

Figure 1 represents a perspective view of our improved lamp-shade. Fig. 2 is an anterior view of it as shown by a cross-section.

A A′ A″ represent a metallic frame composed of tin or other metal. A series of openings or apertures, E D C, &c., are made around the circumference of the shade.

The series of pictures C′ D′ E′ (which may be upon paper, mica, or other suitable substance) are placed in the openings, and rest on the back against the edges of the openings, and in front are retained by a small ornamental frame, H H′ H H′ H H′. The inside of the metal part of the frame A A′ A″ is painted white, so as to give a good reflecting-surface. The pictures C′ D′ E′ over these openings in the frame permit a portion of light to pass through, and give a very ornamental appearance. These pictures may be painted directly upon the mica, or they may be gummed upon the exterior of the mica and then varnished. When the pictures are on paper alone, or on any other substance, they give as ornamental an appearance to the shade, but are more apt to be destroyed by the flame. The mica lining may also be entirely distinct from the picture, the picture merely resting against it. By inclosing these pictures between two sheets of mica they are rendered fire proof. The mica upon the outside gives them a highly ornamental appearance and protects them from the effects of moisture.

Shades made in this way are much cheaper and much more durable than when made entirely of paper, and when the picture is incased between the sheets of mica they are indestructible.

Having thus described our improvement, what we claim as our invention, and desire to secure by Letters Patent, is—

1. The combination of the metallic shade A A′ A″ with the paper pictures C′ D′ E′ between sheets of mica, as above described.

2. The combination of the metallic frame A A′ A″ and the pictures C′ D′ E′ upon paper or any other suitable substance substantially as above described.

3. The combination of the metallic frame A A′ A″ and the pictures C D′ E′ upon paper or other suitable substance and the mica lining, the whole being arranged substantially as herein set forth.

CHARLES WILHELM.
ANNA CATHARINE WILHELM.

Witnesses:
J. G. MINI CHILD,
F. D. BAQUET.